United States Patent [19]
Mullaney

[11] Patent Number: 5,377,799
[45] Date of Patent: Jan. 3, 1995

[54] ELECTROMAGNETIC CLUTCH WITH IMPROVED ACTUATION

[75] Inventor: Richard S. Mullaney, Franklin, Ohio

[73] Assignee: General Motors Corporation, Detroit, Mich.

[21] Appl. No.: 136,052

[22] Filed: Oct. 14, 1993

[51] Int. Cl.$^6$ ............................................. F16D 27/00
[52] U.S. Cl. ................................. 192/84 C; 192/106.1; 192/109 B; 192/89.29
[58] Field of Search ................ 192/84 C, 84 B, 106.1, 192/109 B, 89 QA; 464/73, 92, 94, 95, 98, 101

[56] References Cited

U.S. PATENT DOCUMENTS

| | | | |
|---|---|---|---|
| 1,823,334 | 9/1931 | Payne | 192/84 B |
| 2,315,298 | 3/1943 | Thompson | 192/84 C |
| 3,384,213 | 5/1968 | Bernard et al. | 192/84 |
| 4,189,284 | 2/1980 | Cummins | 192/89 QA X |
| 4,391,356 | 7/1983 | Takemura et al. | 192/89 QA X |
| 4,642,031 | 2/1987 | Farr | 192/84 C X |
| 4,860,867 | 8/1989 | Nishimura | 192/84 C |
| 5,036,964 | 8/1991 | Booth et al. | 192/84 C |
| 5,119,915 | 6/1992 | Nelson | 192/106.1 |
| 5,150,779 | 9/1992 | Booth | 192/106.1 |
| 5,195,625 | 3/1993 | Chang et al. | 192/84 C |
| 5,250,921 | 10/1993 | Van Laningham et al. | 192/84 C X |

FOREIGN PATENT DOCUMENTS

| | | | |
|---|---|---|---|
| 58-128537 | 8/1983 | Japan | 192/84 C |
| 1-220726 | 9/1989 | Japan | 192/84 C |

*Primary Examiner*—Andrea L. Pitts
*Attorney, Agent, or Firm*—Patrick M. Griffin

[57] ABSTRACT

An electromagnetic clutch assembly for an automotive air conditioning compressor is designed so that the return force, as a function of axial displacement, is better matched to the performance requirements of the system. A steel armature, which is pulled toward and into driving contact with a pulley friction disk, moves over a predetermined axial stroke comparable to the nominal axial gap between the armature and disk, plus an allowance for armature wear with time. The armature is attached to the shaft by a stamped stainless steel diaphragm which, in its free state, is concave or dished. When the energized compressor coil pulls the armature toward the disk, the diaphragm is mechanically flattened, as compared to a spring being stretched. The return force of the disk, as opposed to the return force of a stretched spring, is relatively small and flat over the desired axial stroke.

2 Claims, 5 Drawing Sheets

ELECTROMAGNETIC CLUTCH WITH IMPROVED ACTUATION

This invention relates to electromagnetically actuated vehicle air conditioning compressor clutch assemblies in general, and specifically to a clutch in which the return force is better tailored to the operation of the clutch.

BACKGROUND OF THE INVENTION

Air conditioning compressors are powered by an engine belt driven rotor or pulley, and it is important to be able to selectively power the compressor so that it runs more efficiently, in response to cooling demand, and not just in response to the belt. This is generally done through the use of an electromagnetically actuated clutch in which a ferrous armature secured to the compressor drive shaft, which is normally spaced axially away from the pulley, is pulled by a magnetic coil into abutment with a friction disk of the pulley. Some mechanism is needed to return the armature to its off position, and this is typically a simple spring or springs. A good example may be seen in U.S. Pat. No. 4,860,867 to Nishimura. Three separate springs, individual beam members, are bent when the armature is pulled in, and pulled in back when the coil is de-energized. Another, newer design eliminates the separate, metal springs in favor of a unitary plastic or elastomer disk. One such design, such as that shown in coassigned U.S. Pat. No. 3,348,213 to Bernard et al, used a fairly thick elastomer pad or disk, which provides a good deal of torsional cushioning and vibration absorption, in addition to return force. Another integral design uses a thinner disk of plastic, which are more compact, but significantly stiffer than elastomer pads. An example may be seen in U.S. Pat. No. 5,150,779 to Booth. A problem any plastic disk design faces is durability, especially in terms of fatigue and creep over the life of the disk.

All the designs described above create the armature return force basically through a continuous, simple, linear spring action. That is, as the armature is pulled in axially farther in, the spring is stretched proportionally farther. This creates more return force, but, in some cases, more return force than is really needed. The other aspect of armature return force is that it is the force that the coil must overcome to keep the armature and pulley engaged, and too great a return force may cause slippage. This may become especially significant as the armature wears over the life of the clutch. The growing gap between armature and disk means higher spring stretch, more return force, and higher potential for slippage.

SUMMARY OF THE INVENTION

The invention provides an electromagnetic clutch in which the return force applied to the armature is better matched to the operating characteristics of the clutch.

In the preferred embodiment disclosed, a specially shaped diaphragm is used which creates a variable return force. The diaphragm is a stamped steel, generally circular part, but is not a flat disk. Instead, it is stamped into a generally dished or concave shape, with a flat outer rim, a flat inner edge axially inboard of the outer rim, and a conically shaped web interconnecting the two. In the free, unstressed state of the diaphragm, the web makes a shallow positive angle relative to the rim, and is concave, as viewed axially in along the shaft. As the diaphragm is flattened, moving the rim axially inwardly, it is stressed, creating a return force that results not from just stretching a resilient material, but is more mechanical in nature, resulting from the shape change and tendency of the part to return to that shape. More specifically, as the diaphragm initially flattens, a return force is created that initially rises, then falls, then plateaus at a more or less constant level as the outer rim reaches and passes the axially stationary inner edge. The axial motion or stroke produced by the initial flattening is determined by the free state angle of the web and the diameter of the rim. After the diaphragm flattens and goes convex, it begins to stretch similarly to a plain, flat disk, and the return force climbs sharply.

The characteristics of the disk described are matched to the operation of the clutch by considering the initial axial gap between armature and pulley disk, as well as the expected wear allowance over time. By setting the free state web angle to yield an axial stroke that substantially equals the sum of the axial gap and wear allowance, improved clutch operation is achieved. The armature is riveted to the inside of the diaphragm rim, and moves one-to-one with it. The inner edge of the diaphragm is fixed to the hub at such a point that the armature faces the pulley friction disk with the desired axial gap. As the coil is energized, the force that is needed to pull the armature anti diaphragm rim in rises as described, then falls off and plateaus. Therefore, the work needed from the coil, as well as the potential for slippage, are significantly reduced. The point where the return force rises in the diaphragm is generally beyond the point of expected wear.

DESCRIPTION OF THE PREFERRED EMBODIMENT

These and other features of the subject invention will appear from the following written description, and from the drawings, in which.

Figure 1:
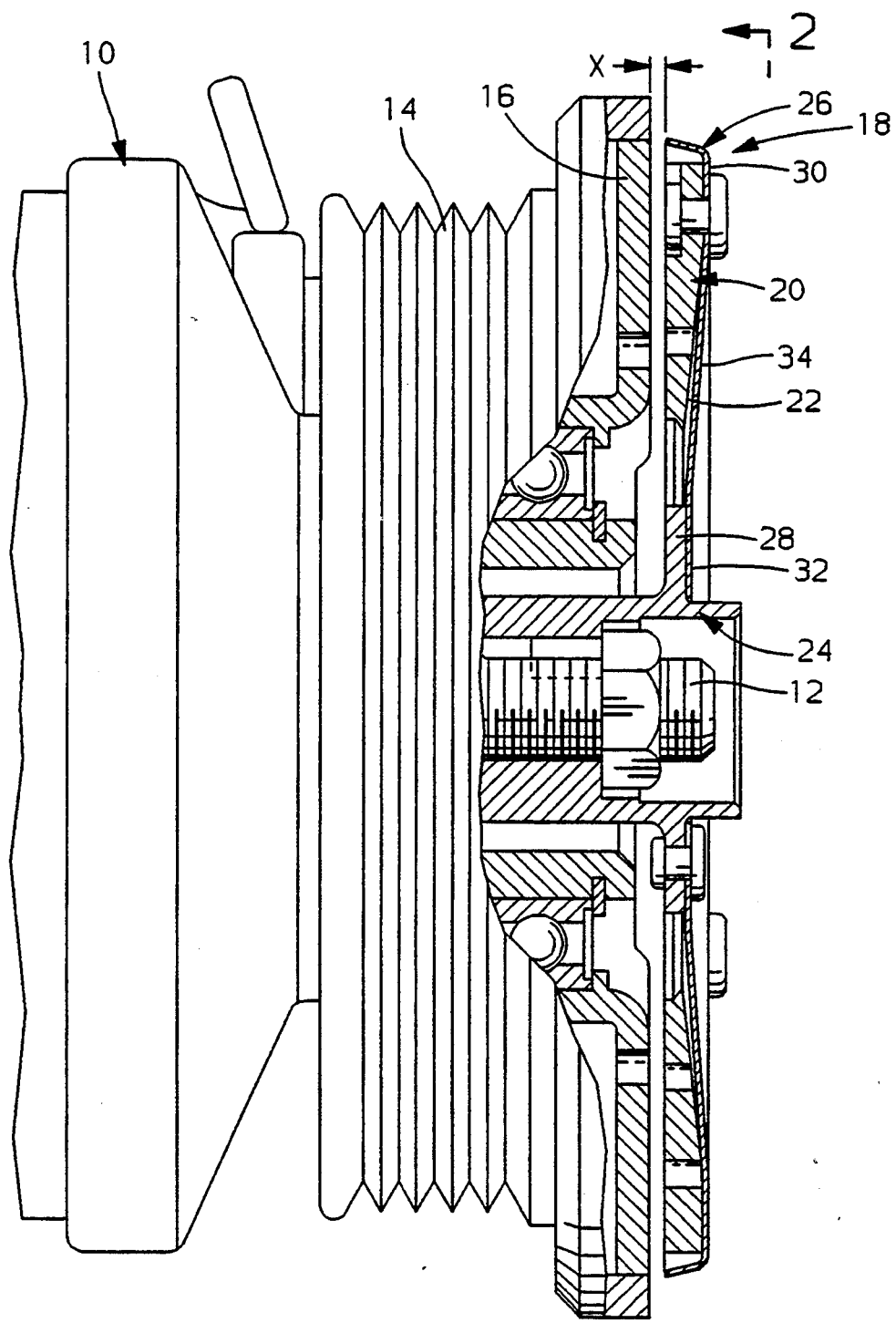
FIG. 1 is a side view of a compressor and pulley with part of the pulley broken away, and showing a preferred embodiment of the clutch assembly of the invention in cross section.
Figure 2:
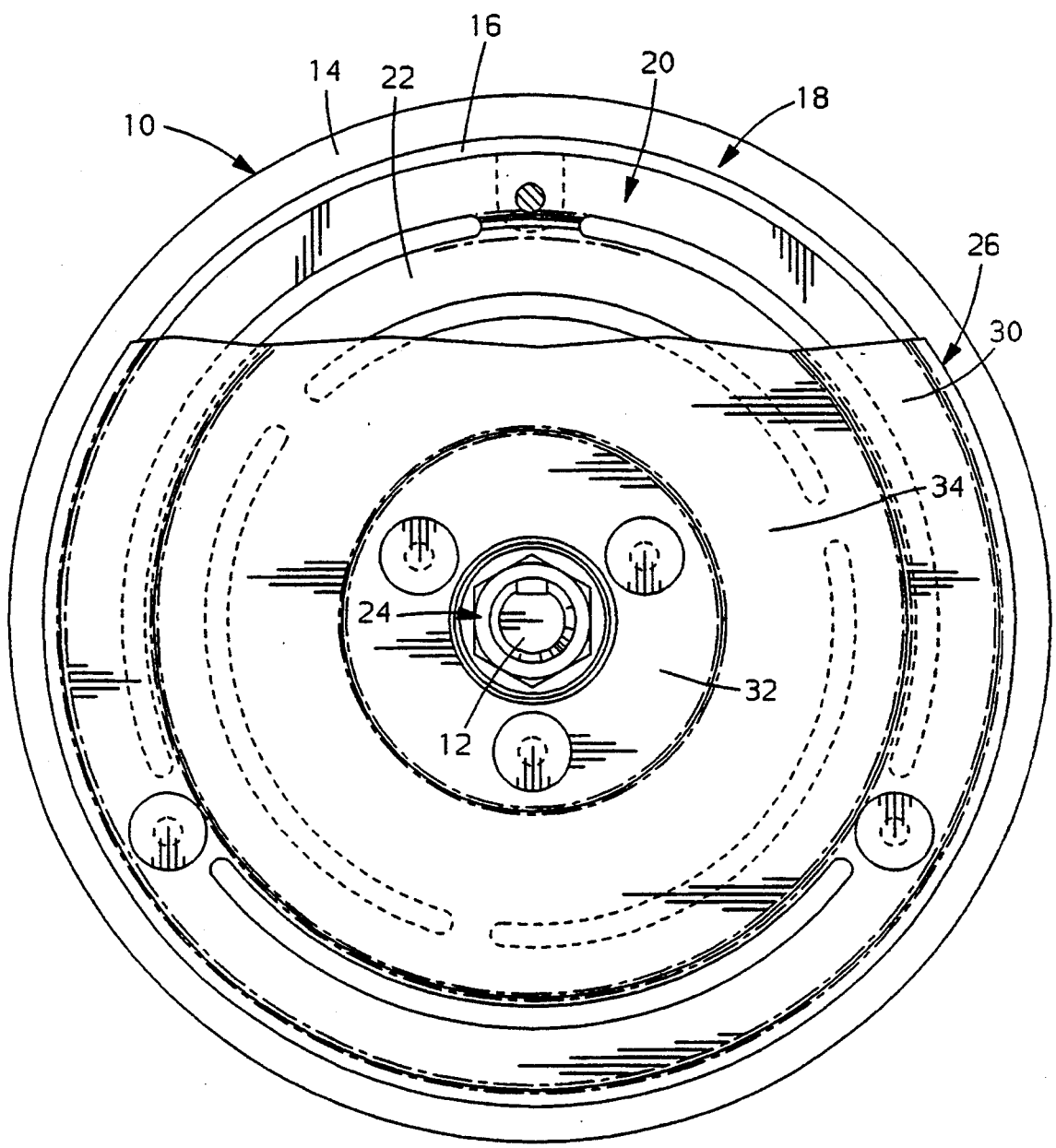
FIG. 2 is a view from the plane 2—2 of FIG. 1, showing part of the diaphragm broken away.

Referring first to FIGS. 1 and 2, the invention is used with conventional vehicle air conditioning compressor (10) which has a central drive shaft (12) and a pulley (14) supported thereon for free rotation concentrically about shaft (12). Pulley (14) includes a flat, annular friction disk (16) that is axially fixed relative to shaft (12), and which faces axially outwardly. Pulley (14) is powered by a nonillustrated engine belt, and drives shaft (12) only when connected thereto by the clutch assembly of the invention, indicated generally at (18). An electromagnetic coil, hidden in FIG. 1 within pulley (14), is energized by the air conditioning control system so as to act on an iron armature (20), one of the three main components of clutch assembly (18). Armature (20) is an annular member comparable in size to friction disk (16), approximately 128 mm in outer diameter and 68 mm in inner diameter in the embodiment disclosed. In the embodiment disclosed, armature (20) has a chamfer (22) tapering to its inner diameter that is approximately 35 mm wide in the radial sense, for a purpose described below. Armature (20), when pulled into tight abutment by the coil, turns with disk (16). A nominal axial gap "x" between the axially facing surfaces of armature (20) and disk (16) is chosen to be large enough to prevent contact when the coil is off, but small enough to give quick actuation, and is approximately 0.6 mm in the embodiment disclosed, but shown larger than scale in the drawing. There is an inevitable slight degree of slippage at actuation before the armature (20) and disk (16) "stick", which, over time, will wear away some of the original thickness of armature (20). As disclosed, armature (20) is just over 4 mm in original thickness, and may be expected to wear perhaps one and one-half mm over time. Axial wear will, of course, cause the gap to grow over the life of the clutch assembly (18), which can present a problem if the return force increases too greatly for the coil to be able to work efficiently over the larger gap. Clutch assembly (18) is designed with that characteristic in mind.

Figure 3:
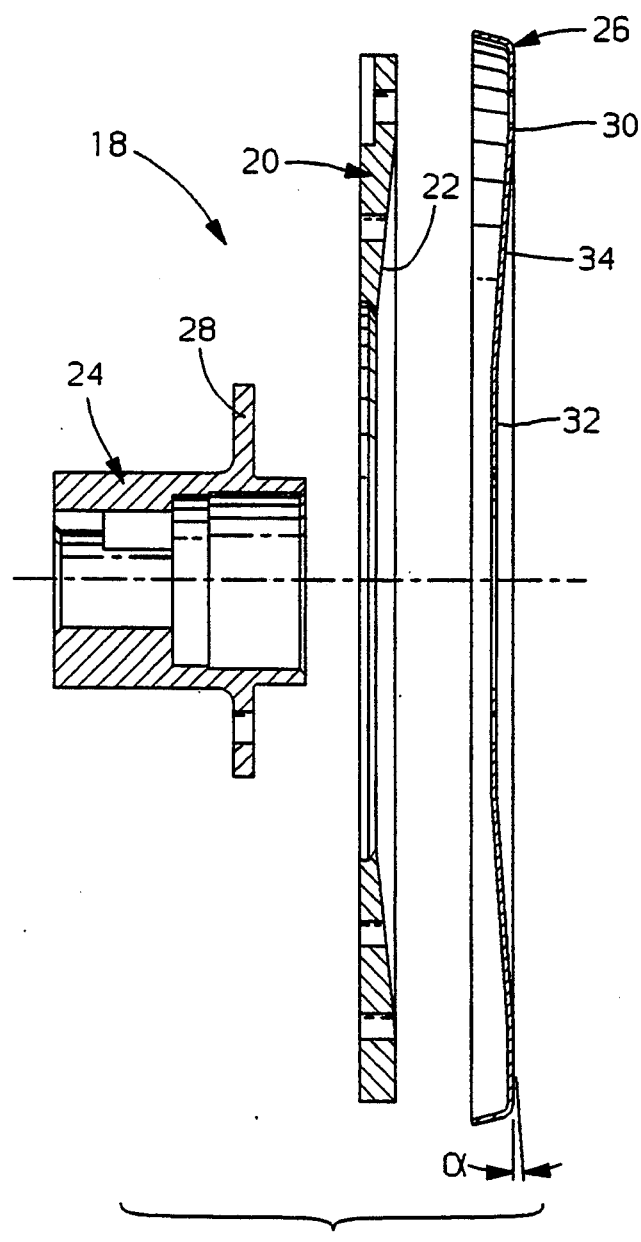
FIG. 3 is a disassembled cross section of the three main components of the clutch assembly of the invention.

Referring next to FIGS. 2 and 3, clutch assembly (18) includes, besides armature (20), a central hub (24) and a diaphragm, indicated generally at (26). Hub (24) has a solid steel part that is adapted to be rigidly keyed and bolted to shaft (12), becoming a part of shaft (12), in effect, after installation. Hub (24) has a circular flange (28) that determines an axially fixed plane perpendicular to shaft (14). Diaphragm (26) is a stainless steel stamping, formed from stock approximately 38 hundredths of an inch thick, and generally annular and dished in shape. A flat outer rim (30) and flat inner edge (32) are radially interconnected by a conical web (34). Rim (30) is slightly larger in diameter to armature (20), about 133 mm, while inner edge (32) comprises an aperture that fits closely over hub (24), of about 25 mm in diameter. Web (34) is approximately 56 mm wide in the radial sense, and defines a shallow angle alpha relative to the plane of rim (30) which, in the unstressed state shown in FIG. 3, can be defined as positive, and is approximately five degrees. Therefore, as viewed in a direction looking axially inwardly and down shaft (12) and hub (24), diaphragm (26) is concave in its unstressed state. This unstressed, concave shape is one that diaphragm (26) has a tendency to return to mechanically if forced out of, a reaction that may be contrasted with a simple stretch and return, or bend and return, of a simple spring member hub flange (28) and the attached. How much the rim (30) can move toward the inner edge (32) before diaphragm (26) is effectively flattened is a function both of alpha and of the dimensions of web (34), which is approximately 103 and 47 mm in diameter at its outer and inner limits respectively in the embodiment disclosed. This translates into approximately two mm of possible axial motion of rim (30) before diaphragm (26) is essentially flattened.

Figure 4:
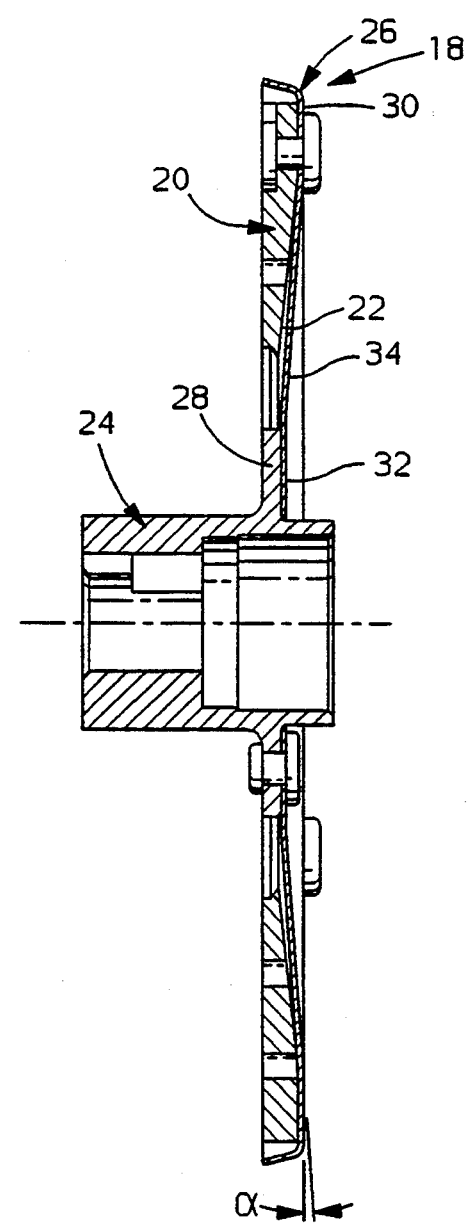
FIG. 4 is a cross section of the clutch in its free state.
Figure 5:
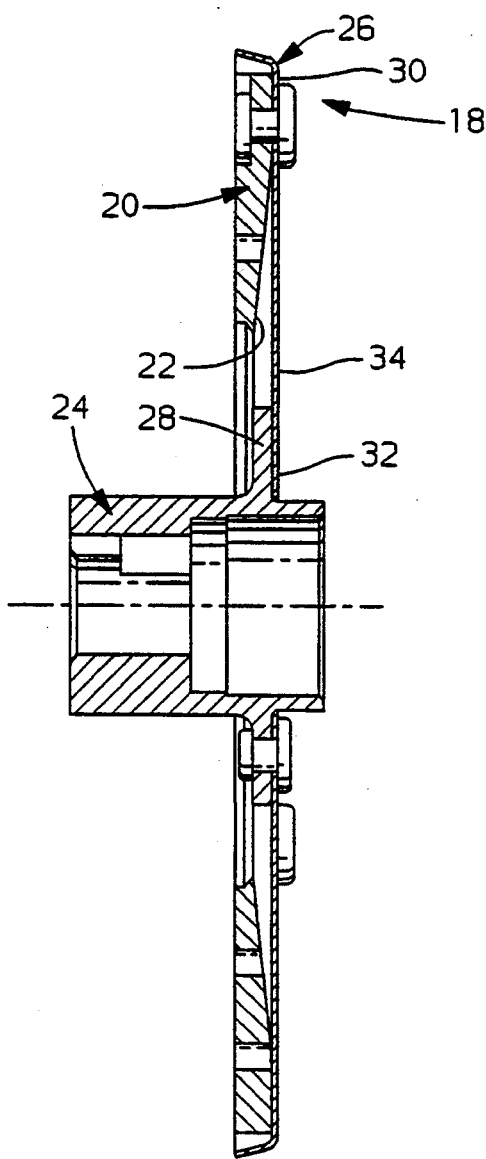
FIG. 5 is a view like FIG. 4, but showing the shape of the diaphragm when it has been substantially flattened.

Referring next to FIGS. 1, 3 and 4, clutch assembly (18) is assembled by riveting the axially outer surface of armature (20) to the inside of rim (30), and riveting inner edge (32) to the outside of hub flange (28). As best seen in FIG. 3, the armature chamfer (22) radially overlaps with and generally matches the contour of web (34), but with an angle that is approximately one-half of a degree less. What this does, during the riveting operation, is to very slightly flatten web (34) and stress diaphragm (26), creating what may be termed a preload that prevents rattle. This flattening is so slight, however, that the shape of diaphragm (4) shown in the FIG. 4 assembled view can really still be considered the free state, equivalent to its shape in FIG. 3. Finally, clutch assembly (18) is installed by bolting hub (24) to shaft (12) at a position that will place the inner surface of armature (20) axially away from friction disk (16) with the desired initial gap. After installation, inner edge (32) is axially fixed relative to shaft (12), but rim (30), along with armature (20), can shift axially in, at least until the gap is closed. The reference frame for the degree of axial motion of diaphragm (26) can conveniently be chosen as the plane where rim (30) lies in FIG. 1, the nonactuated condition. While the axial gap x in FIG. 1 is measured from the surface of armature (20), that surface wears with time, and the total axial motion of either surface is the same in any event.

Figure 6:
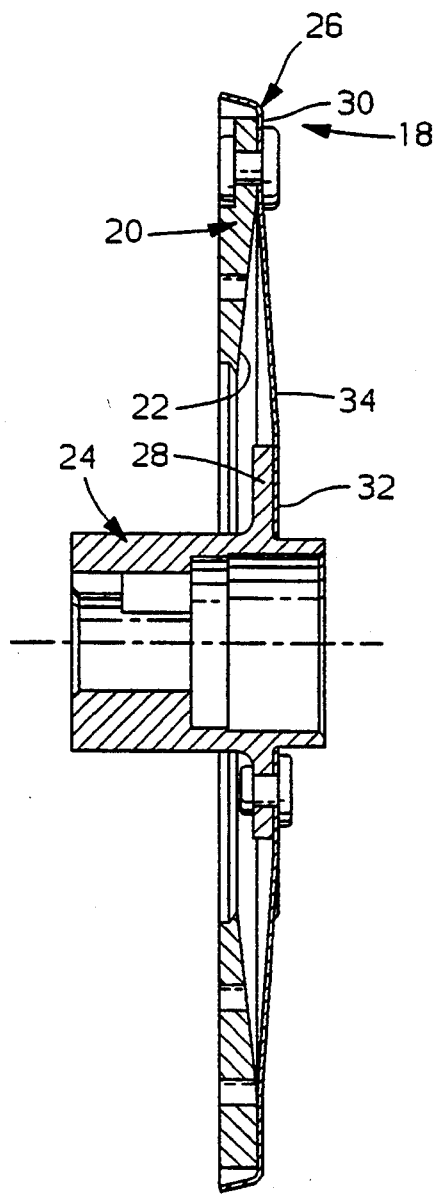
FIG. 6 is a view like FIG. 4, but showing the shape that the diaphragm would take on if it were stressed beyond the point in FIG. 5.
Figure 7:
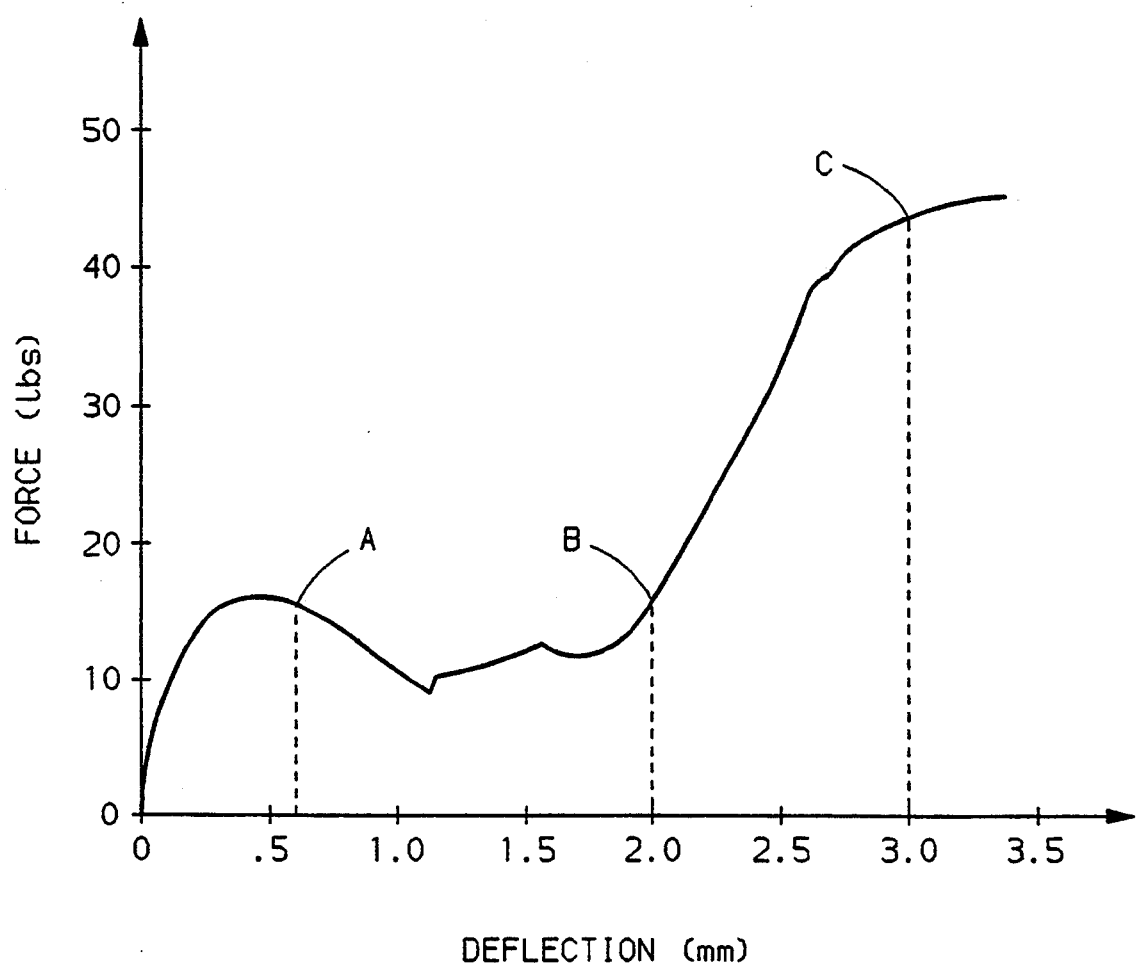
FIG. 7 is a graph showing return force versus deflection of the clutch assembly.

Referring next to FIGS. 4, 5, 6 and 7, the operation of clutch assembly (18) is illustrated. Referring first to FIG. 7, the general response curve of diaphragm (26) in relation to axial deflection, that is, deflection of rim (30) in from its nonactuated FIG. 4 position, is illustrated. The return force initially rises to approximately fifteen pounds, then falls off to approximately ten pounds, where it remains relatively constant over a plateau of about ten pounds. It then rises sharply, after a deflection of approximately two mm. Three points marked on the FIG. 7 graph illustrate corresponding points in the deflection of diaphragm (26) during the operation of clutch assembly (18). Point A is the point where the coil would pull armature (20) and disk (16) into contact or abutment and close gap x, before significant wear on armature (20), corresponding to about 0.6 mm of deflection. Point B is the point of contact after significant wear on armature (20), of approximately two mm, where the force starts to rise. This is also the point shown in FIG. 5 where diaphragm (26) is essentially flat. So, over time, as armature (20) wears, the return force that clutch assembly (18) can expect to experience lies in the range between the points A and B, resulting from diaphragm (26) being pulled from the FIG. 4 concave shade to the FIG. 5 flat shape. Again, the return force produced is more complex than a simple stretching or bending response, and more akin to a shape memory response. If diaphragm (26) were pulled beyond the flat point to "snap through" to a convex shape, as shown in FIG. 6, corresponding to a greater deflection to the point C, then the return force response would rise rapidly, as would a standard flat disk being pulled out its initial flat shape. It is unlikely that clutch assembly (18) would ever wear enough that gap x would grow enough to allow that much axial deflection, however, so the FIG. 6 position is basically hypothetical. The expected working range of diaphragm (26) over the expected wear life of armature (20) is just in the A to B range, short of "snap through". Since the return force is relatively small and constant over that expected range, the necessary power for the coil is correspondingly small. There is also less potential for slippage between the surfaces of armature (20) and disk (16), so that the wear rate should be less rapid. Furthermore, the fatigue life of a solid metal disk like diaphragm (26) is much better than a plastic disk, with less creep. Diaphragm (26) also offers all the shielding of the coil and pulley (14) that a solid plastic disk would provide.

Variations in the disclosed embodiment could be made. For example, a material other than stainless steel could potentially be stamped or otherwise formed into the shape of diaphragm (26), so long as it was nonmagnetic. A metal is more likely to provide the desired response than is a plastic material, however. If otherwise necessary to gain tooling access to components on the other side of diaphragm (26), it could be partially relieved, as by a cutout. This would disturb the return force response somewhat, but not to too great a degree so long as the cutouts did not remove too much material from web (34). Hub (24) could conceivably be an integral part of shaft (12), or whatever part of shaft (12) to which the inner edge (32) was secured. A much narrower armature would not necessarily radially overlap the web (34) of diaphragm (26), and so would not have to be chamfered as at (22) in order to clear and match the slope of web (34). However, the slight prestress created by the partial abutment between the armature chamfer (22) and the diaphram web (34) is an advantage, as noted, in preventing rattle. Furthermore, a prestress could be created simply by riveting a completely flat, unchamfered armature to diaphragm (26), so long as the armature was wider than the flat rim (30), so that it would be forced into web (34) during the riveting operation. Therefore, it will be understood that it is not intended to limit the invention to just the embodiment disclosed.

The embodiments of the invention in which an exclusive property or privilege are claimed are defined as follows:

1. An electromagnetic clutch assembly in combination with a fluid pumping apparatus having a central drive shaft and a powered rotor with a generally annular drive member supported for free rotation about said shaft, said clutch assembly comprising, a central hub secured to said drive shaft and having a flange that defines a plane that is axially fixed and perpendicular relative to said drive shaft, an annular armature radially spaced from said hub and adapted to be electromagnetically actuated and pulled axially into abutment with said drive member when said clutch assembly is actuated, said armature being subject to an axial wear allowance over the life of said clutch, and, a resilient, generally annular and circumferentially complete diaphragm member having an outer rim fixed to said armature and an inner edge fixed to said hub flange so as to be located axially inboard of said rim when said diaphragm member is in a free state, and a dished web interconnecting said inner edge and rim which, in said free state, is concave relative to said rim so that said rim, as it is forced out of said free state and axially toward said hub flange and inner edge acts to flatten and stress said web, thereby creating a resilient return force which initially rises, then falls to a plateau as said rim moves over a predetermined axial stroke, said hub being fixed to said shaft so as to space said armature from said drive member with an initial axial gap which, when added to said wear allowance, falls generally within said predetermined axial stroke.

2. An electromagnetic clutch assembly for use with a fluid pumping apparatus of the type having a central drive shaft and a powered rotor with a generally annular drive member supported for free rotation about said shaft, said clutch assembly comprising, a central hub secured to said drive shaft and having a flange that defines a plane that is axially fixed and perpendicular relative to said drive shaft, an annular armature radially spaced from said hub and adapted to be electromagnetically actuated and pulled axially into abutment with said drive member when said clutch assembly is actuated, said armature being subject to an axial wear allowance over the life of said clutch, and, a resilient, generally annular and circumferentially complete diaphragm member having a flat outer rim, an inner edge fixed to said hub flange so as to be located axially inboard of said rim which said diaphragm member is in a free state, and a generally conical web interconnecting said inner edge and rim which, in said free state, has a predetermined shallow positive angle relative to said rim, so that said rim, as it is forced out of said free state and axially toward said inner edge acts to flatten and stress said web, thereby creating a resilient return force which initially rises, then falls to a plateau as said rim moves over a predetermined axial stroke, said hub being fixed to said diaphragm rim shaft so as to space said armature from said drive member with an initial axial gap which, when added to said wear allowance, tails generally within said predetermined axial stroke.

* * * * *